US009864856B2

(12) United States Patent
Marquardt et al.

(10) Patent No.: US 9,864,856 B2
(45) Date of Patent: *Jan. 9, 2018

(54) EFFICIENT HARDWARE TRUST VERIFICATION IN DATA COMMUNICATION SYSTEMS THAT COMPRISE NETWORK INTERFACE CARDS, CENTRAL PROCESSING UNITS, AND DATA MEMORY BUFFERS

(71) Applicant: Sprint Communications Company L.P., Overland Park, KS (US)

(72) Inventors: Ronald R. Marquardt, Woodinville, WA (US); Lyle Walter Paczkowski, Mission Hills, KS (US); Arun Rajagopal, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/584,202

(22) Filed: May 2, 2017

(65) Prior Publication Data

US 2017/0235942 A1    Aug. 17, 2017

Related U.S. Application Data

(63) Continuation of application No. 14/855,647, filed on Sep. 16, 2015, now Pat. No. 9,673,982.

(51) Int. Cl.
G06F 21/00 (2013.01)
G06F 21/44 (2013.01)
(Continued)

(52) U.S. Cl.
CPC ............ G06F 21/44 (2013.01); G06F 21/445 (2013.01); G06F 21/50 (2013.01); G06F 21/575 (2013.01);
(Continued)

(58) Field of Classification Search
CPC .......... G06F 21/50; G06F 21/57; G06F 21/70; G06F 21/71; G06F 21/575; G06F 21/577
See application file for complete search history.

(56) References Cited

U.S. PATENT DOCUMENTS 7,581,033 B2    8/2009  Ebersole et al.
8,300,641 B1    10/2012 Vincent et al.
(Continued)

OTHER PUBLICATIONS

"Network interface controller", Nov. 15, 2015; 5 pages; wikipedia.org.

Primary Examiner — Edward Zee

(57) ABSTRACT

A data communication system comprises a Network Interface Card (NIC), Central Processing Unit (CPU), and Data Memory Buffer (DMB) to efficiently verify hardware-trust. The NIC, CPU, and DMB execute boot-up software, and in response, the NIC, CPU, and DMB execute hardware-trust software to assert control over their Application Programming Interfaces (APIs). The NIC, CPU, and DMB receive and hash hardware-trust data with their physically-embedded hardware-trust codes to generate hardware-trust results. The NIC, CPU, and DMB transfer their hardware-trust results for hardware-trust validation. The CPU may execute Network Function Virtualization Virtual Network Functions (NFV VNFs) for Software Defined Networks (SDNs).

20 Claims, 5 Drawing Sheets

(51) Int. Cl.
*G06F 21/50* (2013.01)
*G06F 21/57* (2013.01)
*H04L 9/32* (2006.01)
H04L 12/931 (2013.01)
H04L 29/06 (2006.01)

(52) U.S. Cl.
CPC .......... *H04L 9/3234* (2013.01); *H04L 9/3236* (2013.01); *H04L 49/351* (2013.01); *H04L 63/08* (2013.01)

(56) References Cited

U.S. PATENT DOCUMENTS

| | | |
|---|---|---|
| 8,458,791 B2 | 6/2013 | Do et al. |
| 8,462,780 B2 | 6/2013 | Vincent et al. |
| 8,483,221 B1 | 7/2013 | Vincent et al. |
| 8,649,770 B1 | 2/2014 | Cope et al. |
| 8,686,838 B1 | 4/2014 | Eriksson et al. |
| 8,774,213 B2 | 7/2014 | Vincent et al. |
| 8,942,236 B1 | 1/2015 | Vincent et al. |
| 9,053,059 B2 | 6/2015 | Scott-Nash |
| 9,210,576 B1 | 12/2015 | Cope et al. |
| 2010/0281273 A1* | 11/2010 | Lee ................... G06F 21/72 713/190 |
| 2011/0302415 A1 | 12/2011 | Ahmad et al. |
| 2012/0191800 A1* | 7/2012 | Michels ............. H04L 49/901 709/212 |
| 2014/0201374 A1 | 7/2014 | Ashwood-Smith et al. |
| 2014/0310707 A1 | 10/2014 | Rajan et al. |
| 2014/0376555 A1 | 12/2014 | Choi et al. |
| 2015/0063166 A1 | 3/2015 | Sif et al. |
| 2015/0180730 A1 | 6/2015 | Felstaine et al. |

\* cited by examiner

EFFICIENT HARDWARE TRUST VERIFICATION IN DATA COMMUNICATION SYSTEMS THAT COMPRISE NETWORK INTERFACE CARDS, CENTRAL PROCESSING UNITS, AND DATA MEMORY BUFFERS

RELATED CASES

This patent application is a continuation of U.S. patent application Ser. No. 14/855,647 that was filed on Sep. 16, 2015 and is entitled "EFFICIENT HARDWARE TRUST VERIFICATION IN DATA COMMUNICATION SYSTEMS THAT COMPRISE NETWORK INTERFACE CARDS, CENTRAL PROCESSING UNITS, AND DATA MEMORY BUFFERS." U.S. patent application Ser. No. 14/855,647 is hereby incorporated by reference into this patent application.

TECHNICAL BACKGROUND

Data communication networks provide various services like internet access, media conferencing, file access, user messaging, and content delivery. Data communication networks use Network Interface Cards (NICs) to exchange user data. Within communication network elements, the NICs interact with Central Processing Units (CPUs) and Data Memory Buffers (DMBs) to perform Direct Memory Access (DMA) transfers. The DMA transfers move the user data between the NICs and the DMBs without using the CPUs to handle the user data. The NICs, CPUs, and DMBs exchange DMA buffer descriptors to initiate and control these DMA transfers.

Hardware-trust of data communication networks is required for many data applications. Hardware-trust is established between data network components by using hardware-trust keys that are physically-embedded in the data network components. A control system transfers trust challenge data (random numbers) to the data network components. The data network components hash the random numbers with their secret hardware-trust keys and return the hardware trust results. A hardware-trust validation system also has the trust challenge data and the secret keys to generate independent versions of the results for comparison and hardware trust validation.

Data communication networks are implementing Network Function Virtualization (NFV) to execute their networking software. NFV distributes the execution of the networking software across various CPU cores, DMB memories, and NIC ports. The networking software comprises Virtual Network Functions (VNFs) like virtual switches and the like. NFV server systems may efficiently host several data communication networks at the same time.

Unfortunately, DMA systems have not been optimized to efficiently handle hardware-trust data. In particular, NFV servers that use DMA for user data transfers have not been optimized to efficiently verify and report network-wide hardware trust.

TECHNICAL OVERVIEW

A data communication system comprises a Network Interface Card (NIC), Central Processing Unit (CPU), and Data Memory Buffer (DMB) to efficiently verify hardware-trust. The NIC, CPU, and DMB execute boot-up software, and in response, the NIC, CPU, and DMB execute hardware-trust software to assert control over their Application Programming Interfaces (APIs). The NIC, CPU, and DMB receive and hash hardware-trust data with their physically-embedded hardware-trust codes to generate hardware-trust results. The NIC, CPU, and DMB transfer their hardware-trust results for hardware-trust validation. The CPU may execute Network Function Virtualization Virtual Network Functions (NFV VNFs) for Software Defined Networks (SDNs).

DETAILED DESCRIPTION

Figure 1:
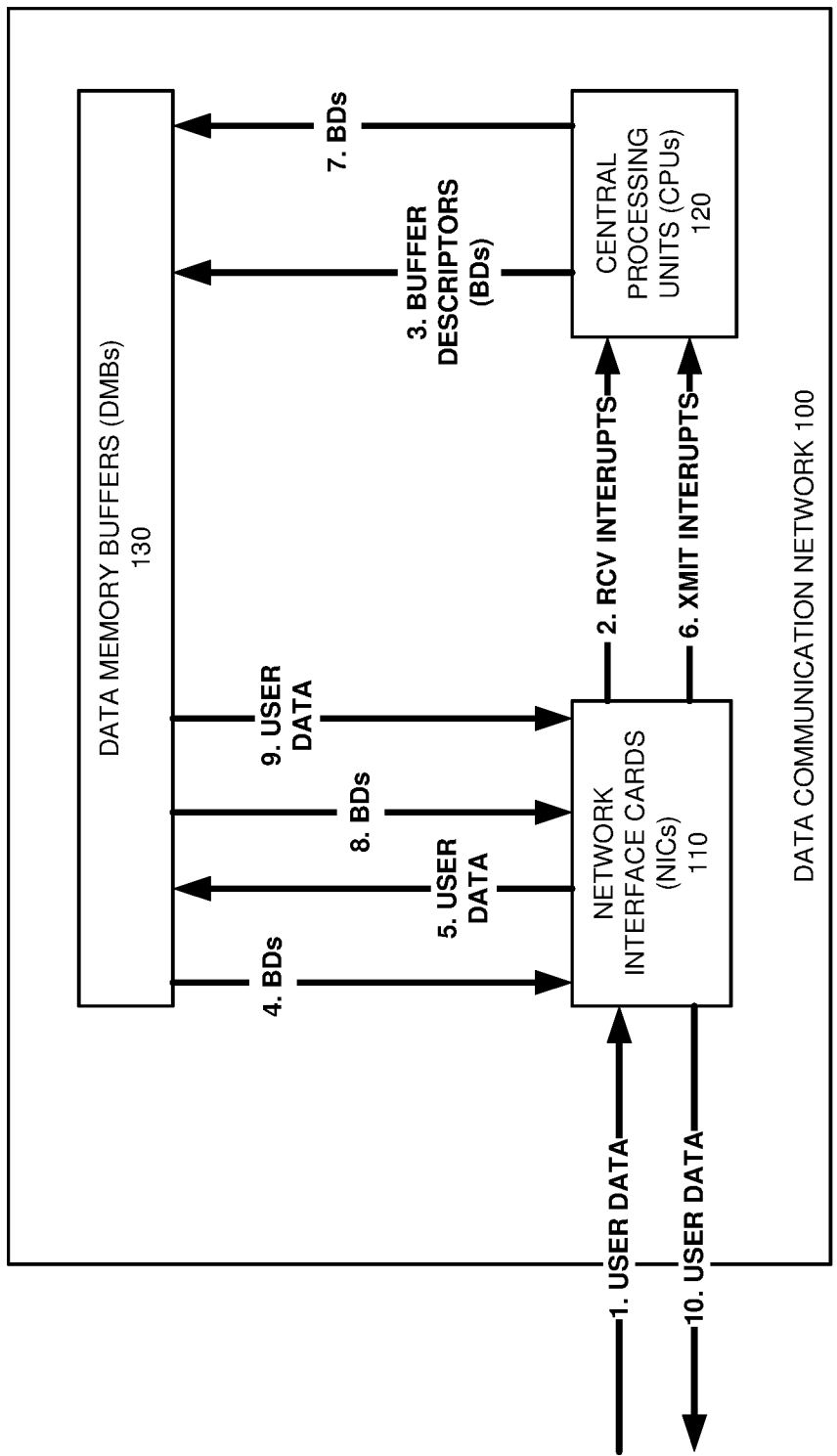
FIG. 1 illustrates a data communication network to efficiently exchange user data communications using Network Interface Cards (NICs), Central Processing Units (CPUs), and Data Memory Buffers (DMBs).

FIG. 1 illustrates data communication network 100 to efficiently exchange user data communications using Network Interface Cards (NICs) 110, Central Processing Units (CPUs) 120, and Data Memory Buffers (DMBs) 130. The user data communications might be video conferencing, media streaming, Internet access, file transfers, or some other user data transfer. Typically, NICs 110, CPUs 120, and DMBs 130 are configured to operate as data communication machines in data communication network 100, such as flow controllers, switches, transcoders, routers, gateways, mobility managers, databases, and/or some other data communication network elements.

NICs 110, CPUs 120, and DMBs 130 each include their own unique physically-embedded read-only trust keys. The trust keys enable remote hardware-trust validation of data communication network 100 through the exchange of random number challenges and corresponding hash results that are generated using the random numbers and the physically-embedded read-only trust keys. These hardware-trust challenges and results may use public/private keys, digital signatures, and certificates of authority to protect their integrity.

NICs 110 comprise communication transceivers and transceiver controllers. CPUs 120 comprise data microprocessors that often have multiple cores. DMBs 130 comprise Random Access Memory (RAM) drives and memory controllers. NICs 110, CPUs 120, and DMBs 130 each have supporting memories, circuitry and software. For example, CPUs 120 usually includes Layer 1 cache memory, metal communication ports, and embedded firmware. The transceiver controllers and memory controllers comprise microprocessors with their own supporting memories, circuitry and software. For example, NICs 110 may store hardware-trust applications in its memory buffers for execution by its host memory controller circuitry.

The arrows on FIG. 1 represent physical Data Bus Structures (DBSs) that exchange data between NICs 110, CPUs 120, and DMBs 130. NICs 110 and DMBs 130 use some of the DBSs to perform Direct Memory Access (DMA) transfers of user data using DMA Buffer Descriptors (BDs). Some of the DBSs have their own unique physically-embedded read-only trust keys for hardware-trust validation. The DBSs comprise bus connections and bus controllers with supporting memories, circuitry and software.

A first operational sequence is described with reference to the numbered arrows on FIG. 1. First, NICs 110 receive and buffer user data. Second, NICs 110 transfer data receipt interrupts to CPUs 120 in response to receiving and buffering the user data. Third, CPUs 120 transfer BDs for the user data to DMBs 130 responsive to the data receipt interrupts from NICs 110. Fourth, DMBs 130 transfer the BDs for the user data to NICs 110 responsive to receiving the BDs from CPUs 120. Fifth, NICs 120 transfer the user data to DMBs 130 responsive to the receiving the BDs for the user data from DMBs 130. DMBs 130 buffer the user data for subsequent transfer. For example, the user data may comprise an Ethernet data frames that are buffered while CPUs 120 determine appropriate egress connections based on Media Access Control (MAC) addressing in the frames.

Sixth, NICs 110 transfer data transmit interrupts to CPUs 110 indicating available data transfer resources. Seventh, CPUs 110 transfer the BDs for the user data to DMBs 130 responsive to receiving the data transmit interrupts from NICs 110. Eighth, DMBs 130 transfer the BDs for the user data to NICs 110 responsive to receiving the BDs from CPUs 120. Ninth, DMBs 130 transfer the user data to NICs 110 responsive to the BDs from CPUs 120. Tenth, NICs 110 transfer the user data responsive to receiving the BDs and the user data from DMBs 130.

Note that operations 1-5 and operations 6-10 usually occur in a contemporaneous manner for various blocks of user data. In addition, CPUs 120 may perform various operations (or none) on the user data while stored in DMBs 130. For clarity on FIG. 1, the various acknowledgements are omitted that flow in the opposite direction and in response to the arrowed operations.

Figure 2:
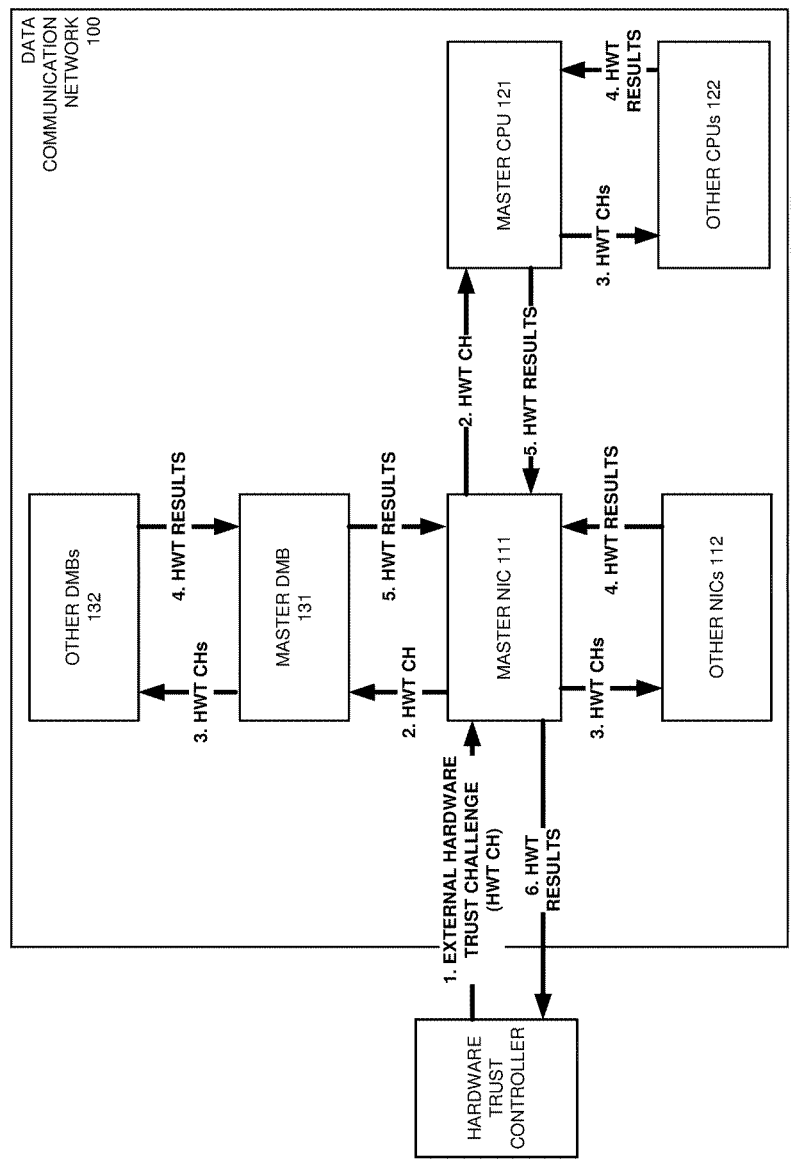
FIG. 2 illustrates the data communication network to efficiently verify hardware-trust using the NICs, CPUs, and DMBs.

FIG. 2 illustrates data communication network 100 that uses NICs, CPUs, and DMBs to efficiently verify hardware-trust. In data communication network 100, NICs 110 of FIG. 1 are now depicted as master NIC 111 and other NICs 112. CPUs 120 of FIG. 1 are now depicted as master CPU 121 and other CPUs 122. DMBs 130 of FIG. 1 are now depicted as master DMB 131 and other DMBs 132. NICs 111-112, CPUs 121-122, and DMBs 131-133 each include their own unique physically-embedded read-only trust keys. The arrows on FIG. 2 again represent physical DBSs that exchange data between NICs 110, CPUs 120, and DMBs 130.

A second operational sequence for data communication network 100 is described with reference to the numbered arrows on FIG. 2. Note that the second operational sequence of FIG. 2 occurs before and contemporaneously with the first operational sequence of FIG. 1. Also note that the following hardware-trust data transfers may use public/private keys, digital signatures, and certificates of authority to protect their integrity.

First, master NIC 111 receives an external hardware-trust validation challenge from an external hardware-trust controller. Second, master NIC 111 generates and transfers a CPU hardware-trust validation challenge to master CPU 121 responsive to the external hardware-trust validation challenge. Master NIC 111 also generates and transfers a DMB hardware-trust validation challenge to master DMB 131 responsive to the external hardware-trust validation challenge.

Third, master NIC 111 generates and transfers NIC hardware-trust validation challenges to other NICs 112 responsive to the external hardware-trust validation challenge. Master CPU 121 generates and transfers CPU hardware-trust validation challenges to other CPUs 122 responsive to the CPU hardware-trust validation challenge from master NIC 111. Master DMB 131 generates and transfers DMB hardware-trust validation challenges to other DMBs 132 responsive to the DMB hardware-trust validation challenge from master NIC 111.

Fourth, other NICs 112 hash the NIC hardware-trust validation challenges from master NC 111 with their physically-embedded, hardware-trust keys to generate and transfer NIC hardware-trust validation results to master NIC 111. Other CPUs 122 hash the CPU hardware-trust validation challenges from master CPU 121 with their physically-embedded, hardware-trust keys to generate and transfer CPU hardware-trust validation results to master CPU 121. Other DMBs 132 hash the DMB hardware-trust validation challenges from master DMB 131 with their physically-embedded, hardware-trust keys to generate and transfer DMB hardware-trust validation results to master DMB 131.

Fifth, master CPU 121 hashes the CPU hardware-trust validation challenge with its physically-embedded, hardware-trust key to generate a master CPU hardware-trust validation result. Master CPU processes the CPU hardware-trust validation results from other CPUs 122 to verify hardware-trust of other CPUs 122. Master CPU 121 transfers its master CPU hardware-trust validation result to master NIC 111 and indicates other CPUs 122 that have verified hardware trust (and any failures). Likewise, master DMB 131 hashes the DMB hardware-trust validation challenge with its physically-embedded, hardware-trust key to generate a master DMB hardware-trust validation result. Master DMB 131 processes the DMB hardware-trust validation results from other DMBs 132 to verify hardware-trust of other DMBs 132. Master DMB 131 transfers its master DMB hardware-trust validation result to master NIC 111 and indicates other DMBs 132 that have verified hardware trust (and any failures).

Sixth, master NIC 111 hashes the external hardware-trust validation challenge with its physically-embedded, hardware-trust key to generate a master NIC hardware-trust validation result. Master NIC 111 processes the master CPU hardware-trust validation result from master CPU 121 to verify hardware-trust of master CPU 121. Master NIC 111 processes the master DMB hardware-trust validation result from master DMB 131 to verify hardware-trust of master DMB 131. Master NIC 111 transfers its master NIC hardware-trust validation result to the external hardware-trust controller and indicates other NICs 122, CPUs 121-122, and DMBs 131-132 that have verified hardware trust (and any failures).

The external hardware-trust controller processes the master NIC hardware-trust validation result to verify hardware-trust of master NIC 111. The external hardware-trust controller also receives data identifying the hardware-trust verifications (and any failures) for other NICs 122, CPUs 121-122, and DMBs 131-132.

Note that the numbered actions for second operational sequence are for organizational purposes and may not necessarily indicate time sequence. For example, master NIC 111 may respond to the external system with its own master NIC hardware-trust results before verifying the hardware trust of other network components. Likewise, master CPU 121 may respond to master NIC 111 with its own master CPU hardware-trust result before verifying the hardware trust of other CPUs 122. Various techniques for scheduling and batching hardware-trust verification tasks may be used to further increase efficiency.

Advantageously, network-wide hardware-trust can be efficiently verified with a single hardware-trust challenge to a single master NIC. The master NIC verifies trust within its own data system. In some examples, a multitude of master NICs in discrete data networks may report to a super-master NIC in the manner described above to verify the hardware-trust of the master NICs. Thus, the super-master NIC aggregates master NIC hardware-trust verification. Large and complex hardware-trusted data communication networks can be efficiently implemented using this NIC-based hierarchy to maintain hardware-trust.

Figure 3:
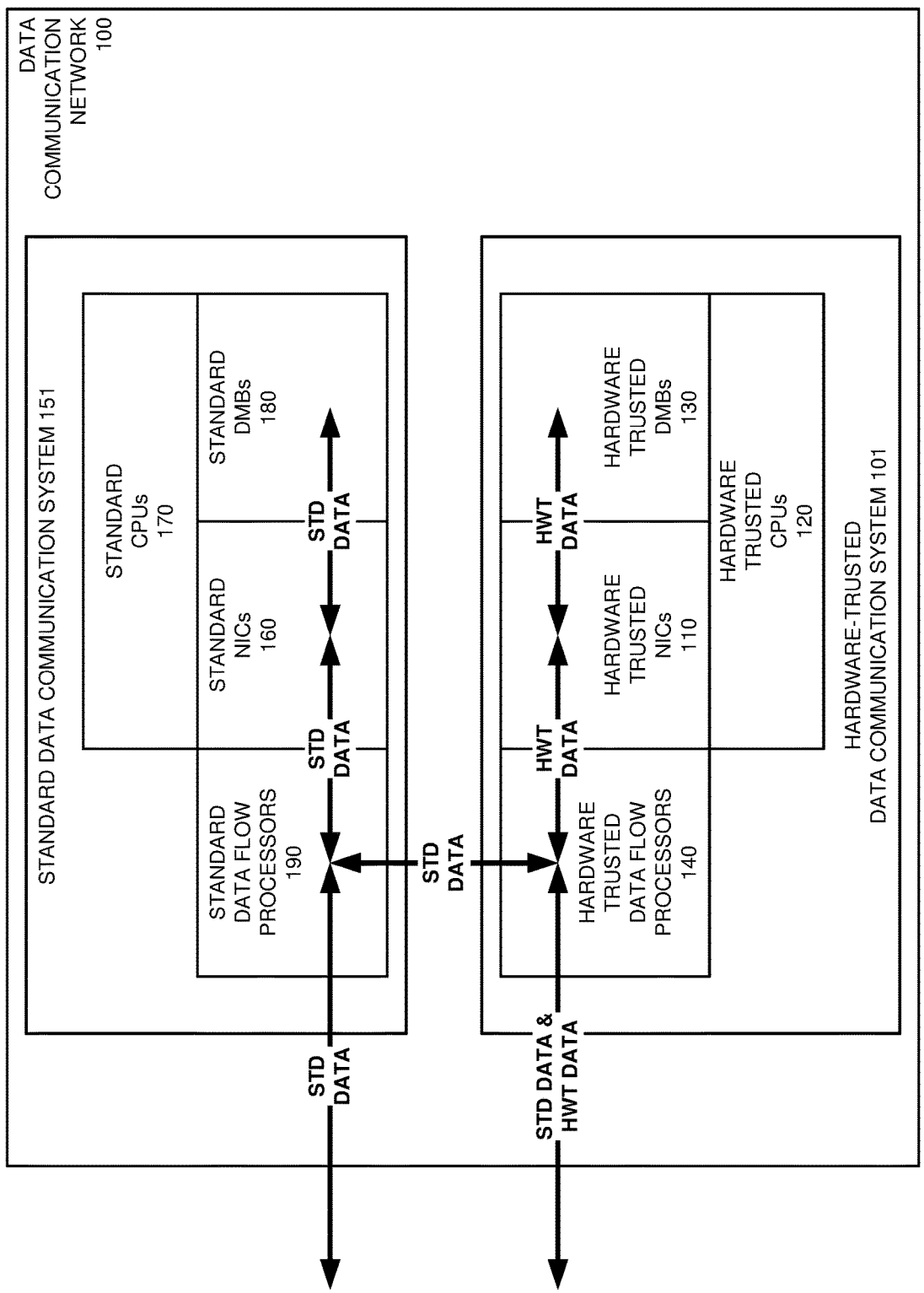
FIG. 3 illustrates the data communication network comprising data flow processors to maintain hardware-trusted user data in a hardware-trusted data communication system.

FIG. 3 illustrates data communication network 100 further comprising data flow processors 140 and 190. In this example, data communication network 100 transmits standard user data and hardware-trusted user data while maintaining the hardware-trusted user data in hardware-trusted components Like FIG. 1, data communication network 100 comprises hardware-trusted NICs 110, CPUs 120, and DMBs 130 that are now shown in hardware-trusted data communication system 101. Hardware-trusted data communication system 101 also includes hardware-trusted data flow processors 140. Data flow processors 140 comprises SDN flow machines, Ethernet switches, Internet routers, and the like. Data flow processors 140 comprise physically-embedded, read-only keys for hardware-trust verification by NICs 110 or some other hardware-trust controller.

In this example, data communication network 100 further comprises standard data communication system 151 that includes standard NICs 160, CPUs 170, DMBs 180, and data flow processors 190. Standard data communication system 150 does not perform hardware-trust verifications in the manner of hardware-trusted data communication system 101. Hardware-trusted data flow processors 140 exchange both standard and hardware-trusted data with various data systems including hardware-trusted data systems.

Hardware-trusted data flow processors 140 identify the hardware-trusted data by: physical ingress/egress connection, source/destination Ethernet address/port, source/destination Internet address/port, Ethernet header/flag, Internet header/flag, and/or some other data marker. Hardware-trusted data flow processors 140 exchange the hardware-trusted data between hardware-trusted external systems and hardware-trusted NICs 110, but data flow processors 140 do not exchange the hardware-trusted data with standard data communication system 151. Hardware trusted NICs 110 exchange the hardware-trusted data with hardware-trusted DMBs 130 using hardware-trusted CPUs 120 without any data exposure to standard data communication system 151.

Figure 4:
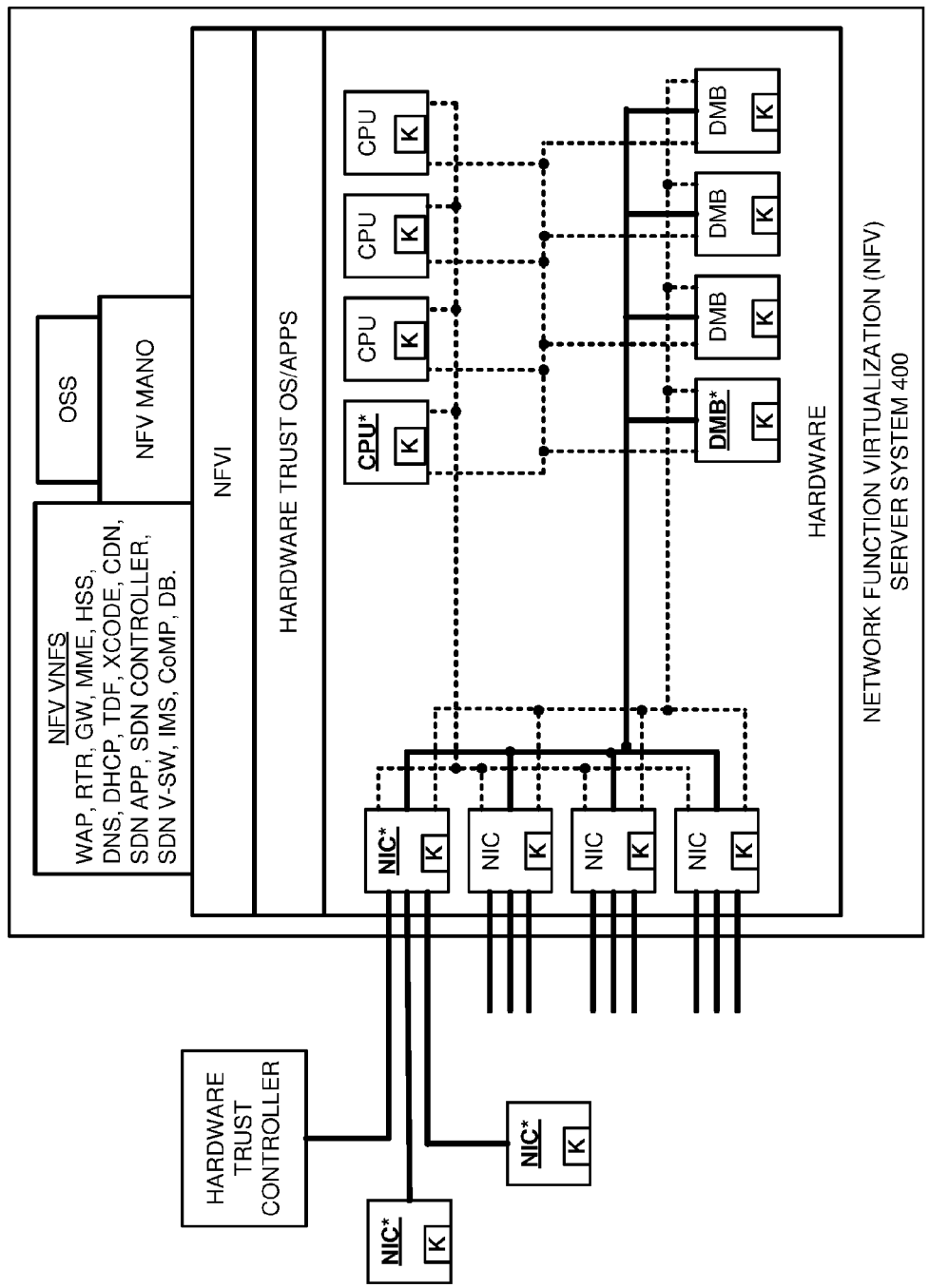
FIG. 4 illustrates a Network Function Virtualization (NFV) server system that comprises NICs, CPUs, and DMBs to efficiently exchange user data communications and verify hardware-trust.

FIG. 4 illustrates Network Function Virtualization (NFV) server system 400 that comprises NICs, CPUs, and DMBs to efficiently exchange user data communications and verify hardware-trust. NFV server system 400 comprises an example of data communication network 100, although network 100 may use different configurations and operations. A master NIC, master CPU, and master DMB are indicated by underlines and asterisks. The NICs are coupled to various external data systems (not shown) and to a hardware trust controller. The NICs are coupled to the DMBs by a control bus (dotted line) and a data bus (solid line). The NICs are also coupled to the CPUs by a control bus (dotted line). The CPUs are also coupled to the DMBs by a control bus (dotted line). The CPUs and NICs are typically coupled by a data bus that is not shown for clarity. Likewise, the CPUs and DMBs are typically coupled by a data bus that is not shown for clarity.

The NICs, CPUs, and DMBs have embedded hardware-trust keys (K). In NFV server system 400, the hardware executes hardware-trust Operating Systems (OS) and Applications (APPS) to hash the trust keys with random data and report the trust results—and/or to verify the reported trust results of others. In some examples, the hardware-trust operating systems and applications may verify network-wide hardware trust at every NFV time cycle zero using a NIC-based trust hierarchy.

The hardware in NFV server system 400 executes NFV Infrastructure (NFVI) software, such as hypervisors and context switches, to support the execution of NFV Virtual Network Functions (VNFs) and NFV Management and Orchestration (MANO) software packages. The hardware in NFV server system 400 executes Operational Support System (OSS) software to direct network data services through the VNF and MANO packages. The NFVI/VNF packages and the MANO package may utilize separate hardware. The VNFs comprise virtual network elements like a: Wireless Access Point (WAP), Internet Router (RTR), Data Network Gateway (GW), Mobility Management Entity (MME), Home Subscriber System (HSS), Domain Name Service (DNS), Dynamic Host Control Protocol (DHCP), Traffic Detection Function (TDF), Transcoder (XCODE), Content Delivery Network (CDN), Software-Defined Network Application (SDN APP), SDN controller, SDN Virtual Switch (V-SW), Internet Multimedia Subsystem (IMS), Coordinated Multipoint Server (CoMP), Policy Database (DB), and/or some other virtual machine or container.

In operation, the master NIC receives an external hardware-trust validation challenge from the hardware-trust controller. The master NIC hashes the external hardware-trust validation challenge from the hardware-trust controller with its hardware-trust key to generate and transfer a master NIC hardware-trust validation result to the hardware-trust controller. The hardware-trust controller processes the master NIC hardware-trust validation result to verify hardware-trust of the master NIC.

In response to the external hardware-trust validation challenge, the master NIC generates and transfers a CPU hardware-trust validation challenge to the master CPU and a DMB hardware-trust validation challenge to the master DMB. The master NIC also generates and transfers NIC hardware-trust validation challenges to the other NICs. The master CPU hashes the CPU hardware-trust validation challenge from the master NIC with its hardware-trust key to generate and transfer a master CPU hardware-trust validation result to the master NIC. The master DMB hashes the DMB hardware-trust validation challenge from the master NIC with its hardware-trust key to generate and transfer a master DMB hardware-trust validation result to the master NIC. The other NICs hash the NIC hardware-trust validation challenges from the master NIC with their hardware-trust keys to generate and transfer a NIC hardware-trust validation results to the master NIC. The master NIC processes the hardware-trust validation results from the master CPU, master DMB, and other NICs to verify hardware-trust of these components. The master NIC indicates the success or failure of the master CPU, the master DMB, and the other NICs to verify hardware-trust to the hardware trust controller.

In response to the CPU hardware-trust validation challenge, the master CPU generates and transfers CPU hardware-trust validation challenges to other CPUs. The other CPUs hash the CPU hardware-trust validation challenges from the master CPU with their hardware-trust keys to generate and transfer CPU hardware-trust validation results to the master CPU. The master CPU processes the hardware-trust validation results from the other CPUs to verify hardware-trust of the other CPUs. The master CPU indicates the success or failure of the other CPUs to verify hardware-trust to the master NIC. The master NIC indicates the success or failure of the other CPUs to verify hardware-trust to the hardware trust controller.

In response to the DMB hardware-trust validation challenge, the master DMB generates and transfers DMB hardware-trust validation challenges to other DMBs. The other DMBs hash the DMB hardware-trust validation challenges from the master DMB with their hardware-trust keys to generate and transfer DMB hardware-trust validation results to the master DMB. The master DMB processes the hardware-trust validation results from the other DMBs to verify hardware-trust of the other DMBs. The master DMB indicates the success or failure of the other DMBs to verify hardware-trust to the master NIC. The master NIC indicates the success or failure of the other DMBs to verify hardware-trust to the hardware trust controller.

In addition to the above operation, the NICs also receive user data from external systems (not shown) and interrupt the CPUs. The CPUs transfer DMA BDs for the user data to the DMBs, and the DMBs transfer the BDs to the NICs. The NICs transfer the user data to the DMBs for buffering. The NICs also interrupt the CPUs with available data transfer resources. The CPUs transfer the BDs for the user data to the DMBs. The DMBs transfer the BDs for the user data to the NICs. The DMBs then transfer the user data corresponding to the BDs to the NICs. The NICs transfer the user data to the external data systems.

Advantageously, the hardware trust controller can efficiently verify hardware-trust across a large network with a single hardware-trust challenge to a single master NIC. In some examples, the master NIC of FIG. 4 is a super-master NIC that is then coupled to other master NICs in other NFV server systems. This super-master NIC could verify the hardware-trust of these other master NICs and report the verified hardware trust of the other master NICs and their NFV server components to the hardware-trust controller. This super-master NIC could also verify the hardware-trust of master NICs and NFV server components that are embedded within untrusted data systems. Thus, large and complex hardware-trusted data communication networks can be efficiently implemented using this NIC-based hierarchy to maintain hardware-trust across several NFV server systems.

Figure 5:
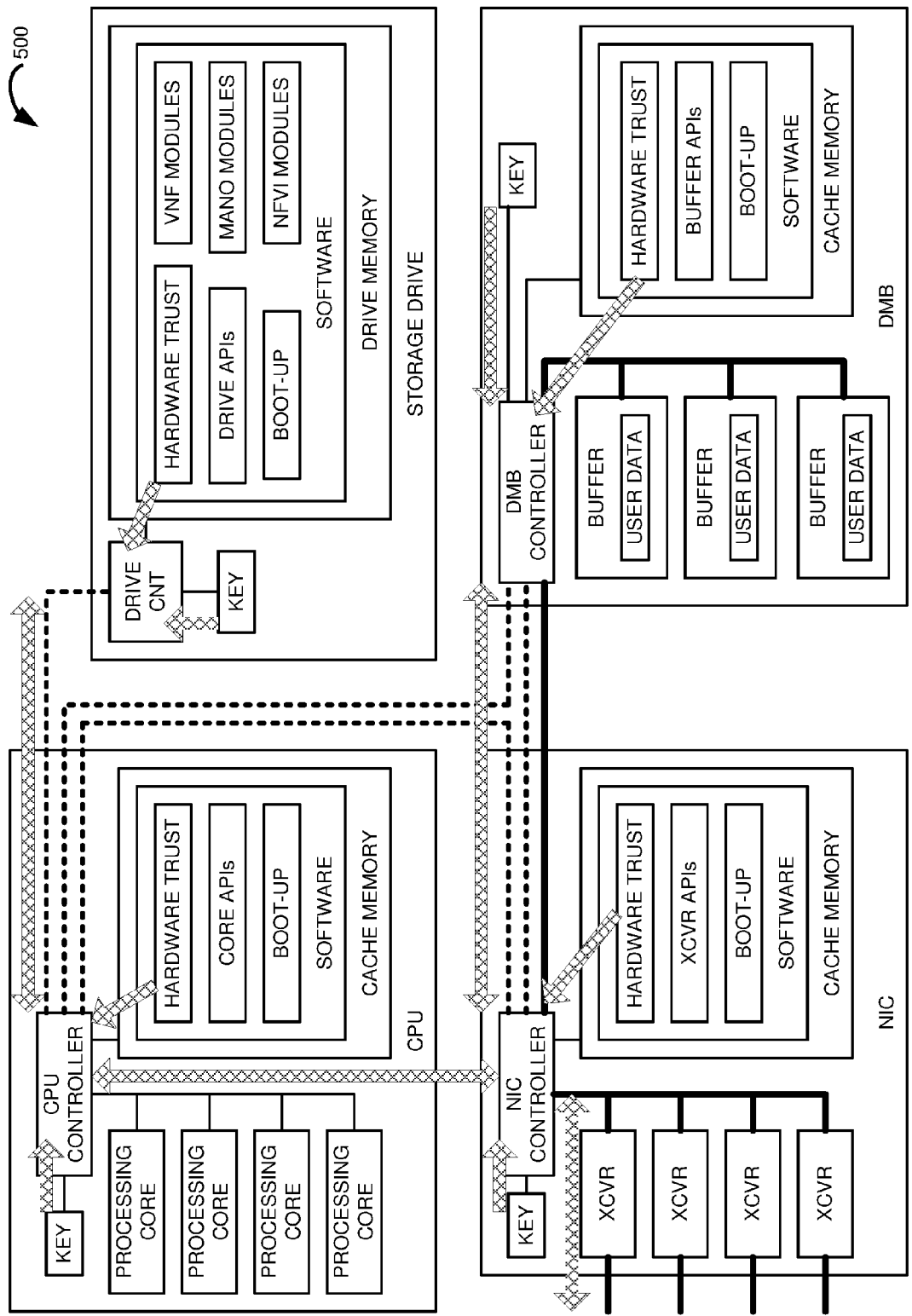
FIG. 5 illustrates a data communication system to efficiently exchange user data communications and verify hardware-trust.

FIG. 5 illustrates data communication system 500 to efficiently exchange user data communications and verify hardware-trust. Data communication system 500 comprises an example of data communication network 100, although network 100 may use different configurations and operations. Data communication system 500 comprises a CPU, NIC, DMB, and storage drive. Additional CPUs, NICs, DMBs, and drives are typically included and coupled as in NFV server system 400.

The CPU comprises a CPU controller, processing cores, and cache memory. The cache memory stores hardware-trust software modules, core Application Programming Interfaces (APIs), and boot-up instruction code. The CPU includes a physically-embedded, read-only trust key for hardware-trust verification.

The NIC comprises a NIC controller, data transceivers, and cache memory. The cache memory stores hardware-trust software modules, transceiver APIs, and boot-up instruction code. The NIC includes a physically-embedded, read-only trust key for hardware-trust verification.

The DMB comprises a DMB controller, data buffers, and cache memory. The cache memory stores hardware-trust software modules, buffer APIs, and boot-up instruction code. The DMB includes a physically-embedded, read-only trust key for hardware-trust verification. In some examples, the cache memory comprises one or more data buffers.

The storage drive comprises a drive controller and a drive memory. The drive memory stores hardware-trust software modules, drive APIs, boot-up instruction code, VNF modules, NFVI modules, MANO modules, and OSS modules. The storage drive includes a physically-embedded, read-only trust key for hardware-trust verification.

The primary user data paths are depicted in solid heavy lines and traverse the NIC transceivers, NIC controller, DMB controller, and DMB buffers. The primary control data paths are depicted in dashed lines and interconnect the various controllers. The primary hardware-trust data paths are depicted by arrows and are described below.

In operation, the various controllers power-up and load their boot-up instruction code that directs the controllers to execute the hardware-trust modules. The hardware-trust modules assert control and then allow the use of the APIs. In addition, the CPU loads and executes the NFVI, VNF, and MANO modules.

The NIC controller receives a hardware-trust challenge from a remote hardware trust controller through a NIC transceiver. The NIC controller uses its key to respond to the hardware-trust challenge. The NIC controller responsively generates hardware-trust challenges for the CPU and the DMB and transfers the hardware-trust challenges to the CPU controller and the DMB controller. The CPU controller uses its key to respond to the hardware-trust challenge. The DMB controller uses its key to respond to the hardware-trust challenge. The NIC controller verifies these hardware trust results and reports CPU and DMB hardware trust status to the hardware-trust controller. The NIC controller, CPU controller, and DMB controller may also challenge, verify, and report hardware-trust for other NICs, CPUs, and DMBs that are not shown for clarity.

For user data reception in the NIC transceivers, the NIC controller transfers an interrupt and DMA BD to the CPU controller to initiate a transfer of the user data from the NIC transceivers to the DMB buffers. For user data transmission from the NIC transceivers, the NIC controller transfers an interrupt and DMA BD to the CPU to initiate a transfer of the user data from the DMB buffers to the NIC transceivers. The CPU processes the NFVI, VNF, and MANO modules to control these data transfers with actions like data routing, inspection, transcoding, and the like.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a data communication system comprising a Network Interface Card (NIC), Central Processing Unit (CPU), and Data Memory Buffer (DMB) to efficiently verify hardware-trust, the method comprising:

the NIC executing NIC boot-up software and responsively executing NIC hardware-trust software to assert control over a NIC Application Programming Interface (API);

the CPU executing CPU boot-up software and responsively executing CPU hardware-trust software to assert control over a CPU API;

the DMB executing DMB boot-up software and responsively executing DMB hardware-trust software to assert control over a DMB API;

the NIC receiving and hashing NIC hardware-trust data with its physically-embedded NIC hardware-trust code and responsively generating and transferring a NIC hardware-trust result;

the CPU receiving and hashing CPU hardware-trust data with its physically-embedded CPU hardware-trust code and responsively generating and transferring a CPU hardware-trust result; and the DMB receiving and hashing DMB hardware-trust data with its physically-embedded DMB hardware-trust code and responsively generating and transferring a DMB hardware-trust result.

2. The method of claim 1 further comprising:
the NIC receiving user data and responsively transferring a data receipt interrupt for the user data;
the CPU receiving the data receipt interrupt transferred by the NIC and responsively transferring a buffer descriptor for the user data;
the DMB receiving the buffer descriptor for the user data transferred by the CPU and responsively transferring the buffer descriptor for delivery to the NIC;
the NIC receiving the buffer descriptor for the user data transferred by the DMB and responsively transferring the user data for delivery to the DMB; and
the DMB receiving and buffering the user data.

3. The method of claim 2 further comprising:
the NIC transferring a data transmit interrupt for delivery to the CPU;
the CPU receiving the data transmit interrupt transferred by the NIC and responsively transferring the buffer descriptor for the user data for delivery to the DMB;
the DMB receiving the buffer descriptor for the user data transferred by the CPU and responsively transferring the buffer descriptor and the user data for delivery to the NIC; and
the NIC receiving the buffer descriptor for the user data, receiving the user data, and transferring the user data.

4. The method of claim 3 wherein the CPU receiving the data interrupts and transferring the buffer descriptor for the user data comprises the CPU executing Network Function Virtualization (NFV) software.

5. The method of claim 4 wherein the CPU receiving the data interrupts and transferring the buffer descriptor for the user data further comprises the CPU executing Virtual Network Function (VNF) software.

6. The method of claim 5 wherein the CPU executing Virtual Network Function (VNF) software comprises the CPU executing Software Defined Network (SDN) application software.

7. The method of claim 5 wherein the CPU executing Virtual Network Function (VNF) software comprises the CPU executing Software Defined Network (SDN) controller software.

8. The method of claim 5 wherein the CPU executing Virtual Network Function (VNF) software comprises the CPU executing Software Defined Network (SDN) virtual switch software.

9. The method of claim 5 wherein the CPU executing Virtual Network Function (VNF) software comprises the CPU executing user mobility management software.

10. The method of claim 5 wherein the CPU executing Virtual Network Function (VNF) software comprises the CPU executing network gateway software.

11. A data communication system to efficiently verify hardware-trust, the data communication system comprising:
a Network Interface Card (NIC) configured to execute NIC boot-up software and responsively execute NIC hardware-trust software to assert control over a NIC Application Programming Interface (API);
a Central Processing Unit (CPU) configured to execute CPU boot-up software and responsively execute CPU hardware-trust software to assert control over a CPU API;
a Data Memory Buffer (DMB) configured to execute DMB boot-up software and responsively execute DMB hardware-trust software to assert control over a DMB API;
the NIC configured to receive and hash NIC hardware-trust data with its physically-embedded NIC hardware-trust code and responsively generate and transfer a NIC hardware-trust result;
the CPU configured to receive and hash CPU hardware-trust data with its physically-embedded CPU hardware-trust code and responsively generate and transfer a CPU hardware-trust result; and
the DMB configured to receive and hash DMB hardware-trust data with its physically-embedded DMB hardware-trust code and responsively generate and transfer a DMB hardware-trust result.

12. The data communication system of claim 11 further comprising:
the NIC configured to receive user data and responsively transfer a data receipt interrupt for the user data;
the CPU configured to receive the data receipt interrupt transferred by the NIC and responsively transfer a buffer descriptor for the user data;
the DMB configured to receive the buffer descriptor for the user data transferred by the CPU and responsively transfer the buffer descriptor for delivery to the NIC;
the NIC configured to receive the buffer descriptor for the user data transferred by the DMB and responsively transfer the user data for delivery to the DMB; and
the DMB configured to receive and buffer the user data.

13. The data communication system of claim 12 further comprising:
the NIC configured to transfer a data transmit interrupt for delivery to the CPU;
the CPU configured to receive the data transmit interrupt transferred by the NIC and responsively transfer the buffer descriptor for the user data for delivery to the DMB;
the DMB configured to receive the buffer descriptor for the user data transferred by the CPU and responsively transfer the buffer descriptor and the user data for delivery to the NIC; and
the NIC configured to receive the buffer descriptor for the user data, receive the user data, and transfer the user data.

14. The data communication system of claim 13 wherein the CPU is configured to execute Network Function Virtualization (NFV) software to receive the data interrupts and transfer the buffer descriptor for the user data.

15. The data communication system of claim 14 wherein the CPU is configured to execute Virtual Network Function (VNF) software to receive the data interrupts and transfer the buffer descriptor for the user data.

16. The data communication system of claim 15 wherein the VNF software comprises Software Defined Network (SDN) application software.

17. The data communication system of claim 15 wherein the VNF software comprises Software Defined Network (SDN) controller software.

18. The data communication system of claim 15 wherein the VNF software comprises Software Defined Network (SDN) virtual switch software.

19. The data communication system of claim 15 wherein the VNF software comprises user mobility management software.

20. The data communication system of claim 15 wherein the VNF software comprises network gateway software.

\* \* \* \* \*